May 13, 1969
P. L. TERRY ET AL
3,444,001
FUEL CELL AND ELECTROLYSER SYSTEM AND METHOD OF OPERATING SAME
Filed May 17, 1966
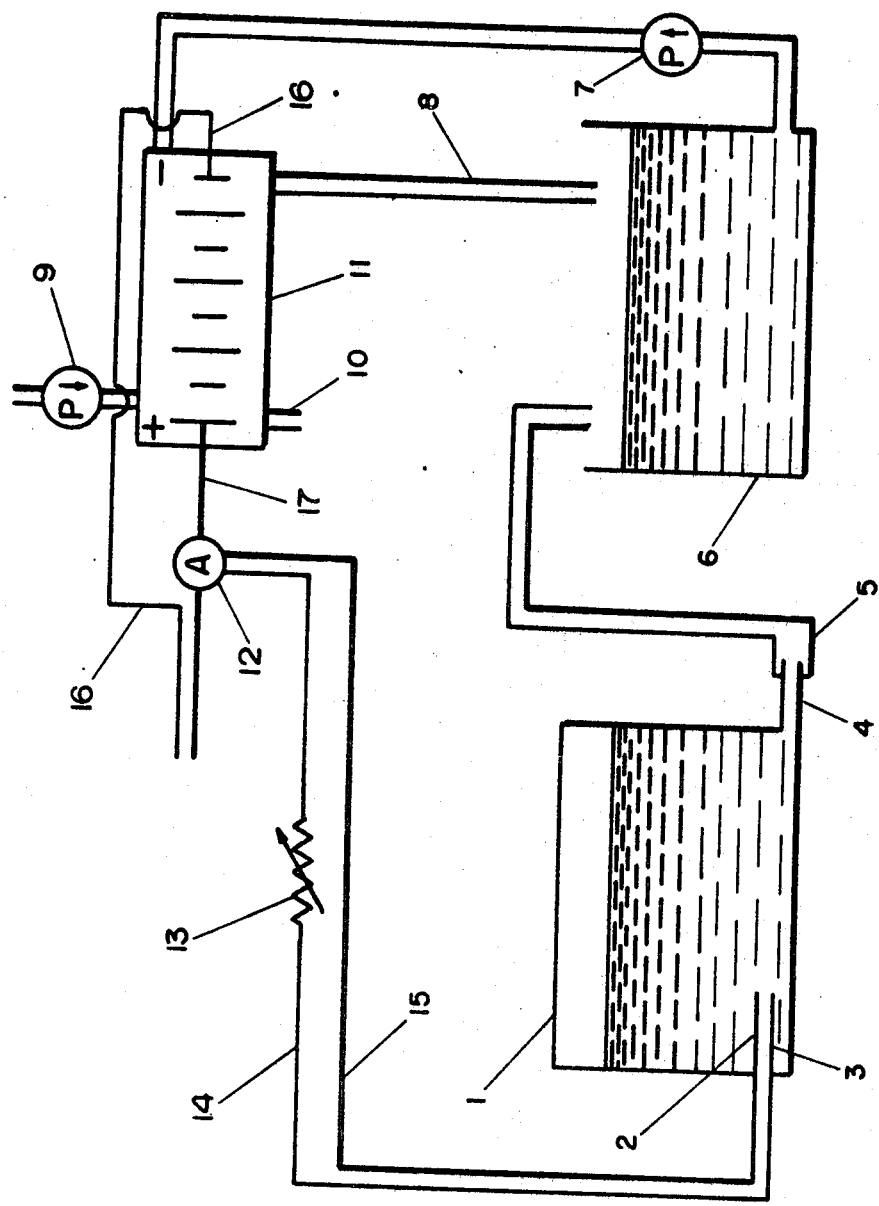
PETER L. TERRY
KURT W. KLUNDER
INVENTORS.
BY *L. A. Ferris*
ATTORNEY

3,444,001
FUEL CELL AND ELECTROLYSER SYSTEM AND METHOD OF OPERATING SAME
Peter L. Terry and Kurt W. Klunder, Melrose, Mass., assignors to Monsanto Research Corporation, St. Louis, Mo., a corporation of Delaware
Filed May 17, 1966, Ser. No. 550,770
Int. Cl. H01m 27/00
U.S. Cl. 136—86         6 Claims

ABSTRACT OF THE DISCLOSURE

A novel fuel cell system and method of operating same. The system and method relate to fuel cell systems having fuel cell stacks operating on dissolved hydrazine as a fuel supply. In accordance with the practice of the invention, the fuel is pumped from the fuel storage area to the cell stack by way of pressure generated by the electrolysis of hydrazine thereby eliminating mechanical pumps for this purpose.

---

This invention relates to fuel cells, and more particularly, provides a novel fuel cell system including an electrochemical fuel pump.

In a fuel cell system employing a liquid, dissolved fuel feed such as aqueous hydrazine, provision must be made to pump the fuel into the cell stack. The usual mechanical pump is ordinarily driven by an electrical motor. Since both the pump and the motor have moving parts, they are sources of potential mechanical failure in the fuel cell system.

It is an object of this invention to provide a fuel cell system including a fuel pump free of moving parts.

A particular object is to provide a fuel cell system including a cell stack fed with hydrazine fuel and a pump for moving the hydrazine to the cell stack wherein the pump is free of moving parts.

A further object is to provide a fuel cell system fed with hydrazine fuel by a pump mechanism free of moving parts and supplying the fuel at a rate proportional to the electrical load on the cell stack.

These and other objects will become evident upon consideration of the following specification and claims.

In accordance with this invention, a fuel cell system is provided including a cell stack, a hydrazine container having a single outlet which is connected to the cell stack feed supply, and electrodes immersed in the hydrazine and electrically connected to draw current from the cell stack during operation of the fuel cell.

The invention is illustrated but not limited by the drawing, which is a diagrammatic illustration, in section, of a fuel cell system embodying the present invention.

As will appear further hereinafter, supplying current to the electrodes which is directly proportional to the current load on the cell stack provides a fuel feed rate which is proportional to the consumption of the fuel in the cell stack.

In operation of the present system, passage of current through the electrodes immersed in the hydrazine produces electrolysis of the hydrazine, generating hydrogen and nitrogen. These gases, trapped in the space above the liquid hydrazine in the container, force the liquid hydrazine through the single outlet of the container, supplying it to the cell stack.

The novel system of this invention thus advantageously draws on the fuel of the fuel cell and the current generated in the fuel cell to produce pumping action without using moving parts. With hydrazine as the fuel being electrolyzed, the gas mixture produced has no hazardous tendency to recombine. As is known, electrolysis of water produces an explosive mixture of gases. However, the decomposition potential of hydrazine is lower than that of water, so that electrolysis of aqueous hydrazine solutions can be effected without producing electrolysis of the water component. There is thus provided a simple, direct and safe method of pumping the fuel feed to the cell stack, employing current provided by the cell, and without using moving parts subject to mechanical failure.

The invention will be readily understood from a consideration of the drawing, which is a diagrammatic cross-sectional view of a fuel cell system in accordance with the invention.

In the drawing, 1 is a hydrazine container, having a single outlet 4 below the liquid level. The outlet 4 is connected by a conduit 5 to a container 6 of electrolyte. The fuel/electrolyte mixture is circulated by a pump 7 through a conduit to the cell stack 11 from which it returns by a conduit 8. The cell stack is supplied with an oxidant, such as air, through a pump 9; the oxidant exits from the cell stack through conduit 10. Means (not shown) are provided for manifolding the fuel/electrolyte mixture and the oxidant throughout the cell stack. Leads 16 and 17 connect the cell stack to an external circuit drawing electricity from the cell. An ammeter 12 connected in series with these leads senses the load drawn by this external circuit and controls variable resistor 13 which in turn controls the current drawn from the cell stack by leads 14 and 15, connected to the electrodes 2 and 3 immersed in the hydrazine in container 1.

Various configurations can be used to embody the invention in an operating system.

The electrolyzing electrodes, for example, can be flat plates, concentric tubes or other structures, and can be self-supporting structures or conductive surfaces on a support. Two electrodes are required, to act as cathode and anode respectively. They will be spaced apart in the hydrazine; minimal spacing, such as ¼ inch distance, is desirable to minimize resistance. The surfaces areas depend on the required hydrazine electrolysis rates, together with the electrode materials and the current supply, but can be quite small. The electrodes are advantageously positioned in the liquid hydrazine so as to remain immersed until substantially all the supply of the hydrazine has been pumped out from the tank.

The materials from which the electrodes are made are preferably catalytically inert so that they have no tendency to produce decomposition of the hydrazine except when current is supplied to them. Any of many metals can be used, such as stainless steel, titanium, nickel, and so forth.

The hydrazine container structure will be closed except for a single outlet. The container outlet to the cell stack will be positioned so that it is below the hydrazine liquid level in the container, to avoid loss of gas from the container. The connection from this outlet to the cell stack can be direct, or the hydrazine can be pumped into an electrolyte solution such as aqueous potassium hydroxide, and the resulting fuel-electrolyte mixture circulated through the cell stack, by a mechanical pump. In the former case, the hydrazine can be pre-dissolved in the electrolyte solution; however, this has the disadvantage that a changing concentration of fuel is supplied to the cell stack, because of depletion of fuel in the solution by the electrolysis. When the fuel-electrolyte mixture is recirculated through the cell stack, the fuel is in any case depleted by consumption in the cell stack. Thus a separate fuel feed to the electrolyte, to replenish its fuel content, is desirable. A system as provided by this invention in which a hydrazine solution is electrolytically decomposed to pump the hydrazine into the electrolyte provides such a separate fuel feed, so that the cell feedstock can be of constant composition. There is then a direct proportionality between the load on the cell stack and the current fed to the electrolyzing electrodes to supply hydrazine at the rate demanded by the cell stack to meet the load.

The electrical circuitry drawing current from the fuel cell stack for operation of the electrodes in accordance with the invention will preferably include means to sense the external load drawing power from the cell stack and means to tap the stack for current proportional to such load, for supplying current to the electrodes in the fuel container. In any case, it will include means to tap the stack for current to supply the electrodes in the fuel container. The tap to the cell stack will be arranged to deliver current at approximately the decomposition potential of hydrazine, which is about 1.5–1.7 volts.

The cell stack will consist of a series of cells, each including an anode and a cathode electrically insulated from each other, connected through an electrolyte between them. The detailed structure of the cell stack can vary.

In referring to a fuel cell system, what is meant is a series of cells, assembled into a battery of cells in a cell stack, to which a fuel and an oxidant are supplied to generate electricity. The system includes associated hardware, such as containers for the fuel, electrolyte and so forth.

The hydrazine supplied to the fuel cell will usually be in solution, although it may be pure liquid hydrazine. The solvent of choice is water, although other suitable solvents can be used if desired. Concentrated solutions, such as liquid hydrazine hydrate ($N_2H_4 \cdot H_2O$) or aqueous solutions such as 5, 3 or 1 molar hydrazine solutions can be used.

The electrolyte in which the hydrazine is dissolved, by being pumped into it in a system as provided by this invention or as a solute which is electrochemically decomposed according to this invention, can be acidic, basic or neutral. Useful electrolytes include, for example, aqueous solutions of bases such as KOH, NaOH and the like, of neutral salts such as $Na_2SO_4$, and of acids such as $H_3PO_4$ and so forth. Aqueous KOH is a preferred electrolyte.

An exemplary system for the operation of a hydrazine/air fuel cell system, for example, can use palladium-surfaced porous conductive anodes to which hydrazine is supplied as a solution in aqueous potassium hydroxide. Useful cathodes for an air oxidant consist, for example, of platinum on a waterproof backing. A mat of asbestos between the anode and cathode of each cell acts as a separator for containing the electrolyte. The hydrazine/electrolyte solution permeates the separator, contacting the anode and cathode. In the stated system, air reacts selectively at the cathode and hydrazine at the anode. The fuel cell system will include means to supply air to the anodes, such as a pump drawing ambient air in through the stack, and means to supply the hydrazine in KOH solution to the cathodes, such as a pump. For example, the anode/separator/cathode/cell assemblies can be enclosed in gaskets with inlet and outlet openings through which the air and hydrazine/KOH solution are pumped. The cells can be connected in series or in parallel, to supply the desired characteristics for the external load.

In an exemplary system, a 60-watt cell stack is connected to a tank of 5 molar aqueous KOH which is in turn connected to a tank of hydrazine hydrate from which the hydrazine is pumped to provide a 1 molar concentration of hydrazine in the KOH solution. Preferably, up to a 2% concentration of KOH is added to the hydrazine hydrate to increase its conductivity. A stainless steel tube with a 1.1 in.² surface area and a concentric cylinder with a 1.7 in.² surface area, perforated to allow access of the hydrazine to its interior, are immersed in the tank. Leads from the interior tube and exterior cylinder pass through insulating gasketing to the exterior of the tank. The circuit from the cell stack senses the external load on the cell stack and delivers current from the cell stack to the leads at 1.5–1.7 volts and at a rate of 25 milliamps/ampere of load. The tank single outlet, located below the liquid level in the tank, leads to a space above the KOH solution in its container, which is vented to the atmosphere. Electrolysis of the hydrazine by passage of current through the electrodes in the hydrazine decomposes the hydrazine into nitrogen and hydrogen, and the pressure of these gases, which are trapped in the tank above the liquid hydrazine, forces the liquid out into the KOH container.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A fuel cell system which comprises a fuel cell stack operating on a fuel feed comprising dissolved hydrazine, said fuel cell being connected to fuel storage means having electrodes arranged to contact fuel in said storage means and connected to draw current from said cell stack to thereby electrolyze a portion of said hydrazine in said fuel and means to retain in said storage means sufficient gaseous products generated by the electrolysis of hydrazine therein to provide a pressure gradient between said storage means and said cell stack to force said fuel in said storage means to said cell stack.

2. A fuel cell system of claim 1 further including a liquid electrolyte storage means positioned between said cell and said fuel storage means.

3. A fuel system of claim 1 further including means to supply current to said electrodes proportional to the load on said cell stack.

4. In the method for generating electricity in a fuel cell stack operating on a fuel comprising dissolved hydrazine, the improvement which comprises the steps of:
   (a) providing a fuel storage zone for said fuel comprising dissolved hydrazine,
   (b) connecting said zone to said fuel stack,
   (c) electrolyzing a portion of said hydrazine in said fuel by electrodes located in said zone and electrically connected to draw current from said cell stack, and
   (d) retaining in said fuel storage zone, sufficant of the gaseous products of the electrolysis described in Step c to establish a pressure gradient between said storage zone and said cell stack to force said fuel from said zone.

5. The method of claim 4 wherein said fuel forced from said zone is mixed with a liquid electrolyte and the resulting mixture is supplied to said cell stack.

6. The method of claim 4 wherein the current applied to said electrodes is proportional to the load on said cell stack.

References Cited

UNITED STATES PATENTS

| | | | |
|---|---|---|---|
| 1,401,035 | 12/1921 | Boisen | 204—230 |
| 2,061,014 | 11/1936 | Wade | 137—210 |
| 2,296,598 | 9/1942 | Cook | 137—210 X |
| 2,400,037 | 5/1946 | Arndt et al. | 137—210 |
| 3,231,333 | 5/1967 | Palmer | 136—86 |

ALLEN B. CURTIS, *Primary Examiner.*

U.S. Cl. X.R.

137—210